United States Patent [19]

Shimizu et al.

[11] Patent Number: 5,159,514
[45] Date of Patent: Oct. 27, 1992

[54] FILM MAGNETIC HEAD HAVING A CORROSION PREVENTION LAYER PROVIDED OVER AN ELECTRODE PAD

[75] Inventors: Osamu Shimizu; Joy Ueoka, both of Tokyo, Japan

[73] Assignee: Fuji Photo Film Co., Ltd., Kanagawa, Japan

[21] Appl. No.: 263,292

[22] Filed: Oct. 27, 1988

[30] Foreign Application Priority Data

Oct. 27, 1987 [JP] Japan .............................. 62-269342

[51] Int. Cl.$^5$ .............................................. G11B 5/147
[52] U.S. Cl. ...................................... 360/126; 357/71
[58] Field of Search ................................ 360/125–126; 156/627; 357/71, 52

[56] References Cited

U.S. PATENT DOCUMENTS

| | | | |
|---|---|---|---|
| 4,417,387 | 11/1983 | Heslop | 357/71 X |
| 4,622,576 | 11/1986 | Buynoski | 357/52 X |
| 4,740,855 | 4/1988 | Diepers | 360/126 |
| 4,836,883 | 6/1989 | Hatcher | 156/627 |

*Primary Examiner*—A. J. Heinz
*Attorney, Agent, or Firm*—Sughrue, Mion, Zinn, Macpeak & Seas

[57] ABSTRACT

An economical and reliable film magnetic head comprises magnetic layers, a coil conductor layer, insulating layers, and a protective layer formed on a substrate, with copper electrode pads connected to the coil conductor layer. A layer of Ti or Cr is formed on the surface of each electrode pad, preventing the copper electrode pads from corroding.

5 Claims, 1 Drawing Sheet

FILM MAGNETIC HEAD HAVING A CORROSION PREVENTION LAYER PROVIDED OVER AN ELECTRODE PAD

BACKGROUND OF THE INVENTION

The invention relates generally to film magnetic heads, and more particularly to an improved film magnetic head which prevents electrode pad corrosion, thereby improving general reliability. In a film magnetic head, it is desirable to construct the electrode pads of a highly conductive material. As a result, copper (Cu) is typically used in forming the electrode pads of a typical film magnetic head. However, the use of copper presents a corrosion problem as an oxide film can form on each of the electrode pads. When corrosion occurs, it is necessary to polish the surface of each electrode pad before a wire can be bonded to it, resulting in an increased number of manufacturing steps and increased costs.

In addition, after polishing the electrode pads, the film magnetic head is subject to cracking after wires have been bonded to the pads, thus lowering the reliability of the device.

A corrosion prevention method is known in the art in which the copper surface is plated with gold to form a film which prevents electrode pad corrosion. Wire bonding can take place after such plating occurs. However, this method is disadvantageous as it increases the number of required manufacturing steps.

In a conventional film magnetic head, a layer of Ti or Cr is formed on the surface of a conductive metal layer forming the pads. More specifically, in order to secure the adhesion of the conductive metal, layer of Cu or a similar conductor to an insulating layer like $SiO_2$, an adhesion layer of Ti or Cr is added between the two layers. The section of the insulating layer corresponding to the electrode pad is etched. In the etching process, the appearance of the Ti or Cr layer signifies the complete removal of the transparent insulating layer. Then the layer of Ti or Cr is etched until the conductive metal layer is exposed to form the pad. Etching ends after the Ti or Cr has been completely removed and the Cu layer is exposed.

SUMMARY OF THE INVENTION

The object of the invention is to provide a new, economical, and efficient method for producing corrosion-resistant electrode pads in film magnetic heads The invention achieves the aforementioned object by teaching a film magnetic head in which magnetic layers, a coil conductor layer, insulating layers, and a protective layer are formed on a substrate. Next, copper electrode pads having a layer of titanium (Ti) or chromium (Cr) formed on their surface, are connected to the coil conductor layer.

In the invention, unlike the conventional film magnetic head in which the layer of Ti or Cr is completely removed during manufacturing by etching, the layer of Ti or Cr is effectively utilized to prevent corrosion of the Cu layer forming the pads. This is achieved by forming a second copper layer on the layer of Ti or Cr so that the Ti or Cr layer still exists after etching. Copper is chosen as the second layer since it is a different color from Ti or Cr, and therefore complete removal can be readily confirmed during etching Thus, the electrode pad is formed with a layer of Ti or Cr on the Cu layer, thus protecting the Cu layer from corrosion.

If the thickness of the Ti or Cr layer formed on the surface of the pad does not exceed 0.5 μm, its electrical resistance may be disregarded when the wires are bonded to the pad.

DETAILED DESCRIPTION

One embodiment of the invention will be described in detail with reference to the accompanying drawings.

Figure 1:
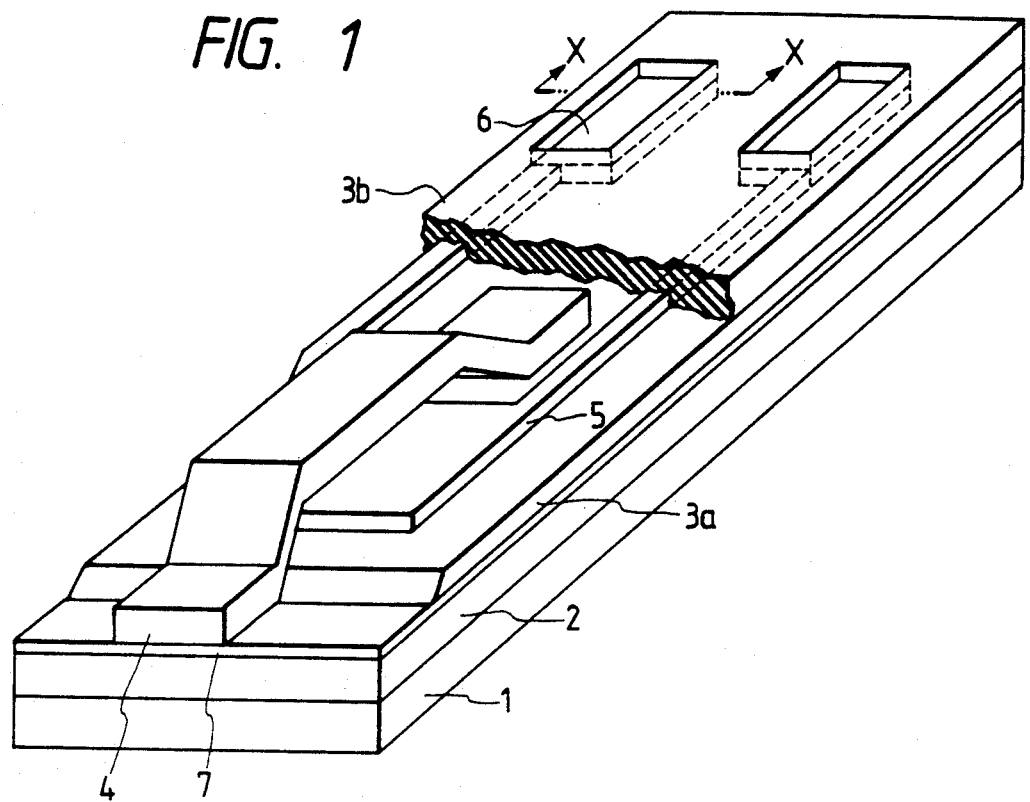
FIG. 1 shows the structure of one example of a film magnetic head according to the invention.

FIG. 1 illustrates a film magnetic head according to the invention in which the second insulating layer, fully described later, is cut away from the structure for clarification. In FIG. 1, reference numeral 1 designates a substrate; numerals 2 and 4 designate a lower magnetic layer and an upper magnetic layer, respectively, which together form a magnetic core; numerals 3a and 3b designate non-magnetic insulating layers; numeral 5 designates a coil conductor layer of Cu: numeral 6 designates electrode pads formed by shaping one end of coil conductor layer 5 extending to the end of the head; and numeral 7 designates a layer of $SiO_2$.

The film magnetic head of the invention is manufactured as follows. Substrate 1 is mirror-finished, and then the following layers are successively formed and etched in predetermined patterns, the lower magnetic layer of core material, the non-magnetic layer 3, the upper magnetic layer 4 of core material, and the coil conductor layer forming a signal coil, the electrode pad formation, and a layer of $SiO_2$. When a protective film is added (not shown), the manufacture of the film magnetic head is complete.

Figure 2A:
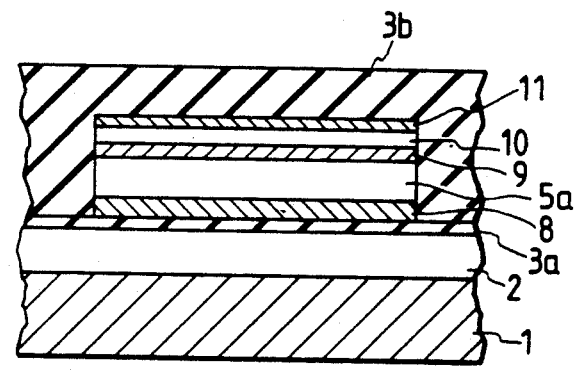
FIG. 2, parts A and B, are cross-sectional views taken along line X—X of FIG. 1 which show the formation of an electrode pad in the film magnetic head.
Figure 2B:
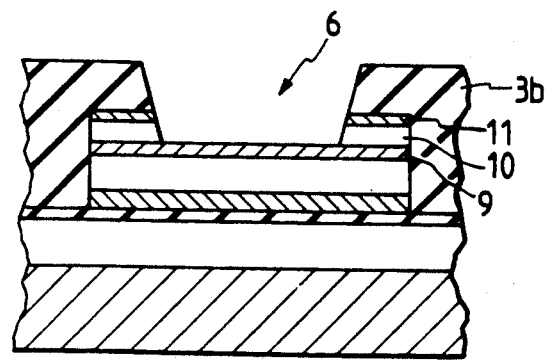

In FIG. 2, parts A and B are cross-sectional views taken along line X—X in FIG. 1, and describe the formation of the electrode pads which are essential elements of the film magnetic head according to the invention.

As shown in part A of FIG. 2, a layer of ferromagnetic material, CoNbEr alloy, is formed to a 15 μm thickness on the ferrite substrate 1 by sputtering, and to form the lower magnetic layer 2. The non-magnetic insulating layer 3a is formed to a 2.0 μm thickness on the lower magnetic layer 2 by sputtering. A first adhesion layer 8 of Ti is formed to a 0.1 μm thickness on each part of the non-magnetic insulating layer 3a by sputtering where the electrode pads 6 are to be formed, and an electrode layer 5a corresponding to each of the terminals of the coil conductor layer 5 forming the signal coil is formed on the first adhesion layer 8 by sputtering. A corrosion prevention layer 9 of Ti is formed to a 0.1 μm thickness on the electrode layer 5a by sputting. A layer of a different color from the Ti layer, namely a second Cu layer 10 similar to the electrode layer is formed on the corrosion prevention layer 9 by sputtering. A second adhesion layer 11 of Ti is formed on the second Cu layer 10 by sputtering. Then, the second non-magnetic insulating layer 3b is formed to a 2 μm thickness by sputtering.

Finally etching is performed to form the electrode pads 6 as shown in FIG. 2, part B. More specifically, the second non-magnetic insulating layer 3b, the second adhesion layer 11, and the second Cu layer 10 are partially removed by ion milling to form pad 6. In the figure, the etching process is shown from above. Etching is continued until the corrosion preventing layer 9 is exposed.

As described above, the second Cu layer 10 is different in color from the corrosion prevention layer 9. Therefore, the etching should be stopped when it advances from the second Cu layer 10 to the corrosion prevention layer 9 of a different color. Thus pad 6 has been formed by depositing the corrosion prevention layer 9 on the electrode layer 5a. Corrosion prevention layer 9 is not limited to a thickness of 0.1 μm. In practice, it may range from 0.02 μm to 1 μm, preferably 0.5 μm or less.

The same oxidation prevention effect can be obtained when the corrosion prevention layer 9 is made of Au instead of Ti or Cr. However, using Au for the formation of the corrosion prevention layer is not suitable as an Au sputtering target is expensive. The following table gives comparisons for the various methods of preventing oxidation.

| Method | Rejects (%) | Material Cost | Manufacturing Steps |
| --- | --- | --- | --- |
| None | 23.5 | low | large (for polishing) |
| Au plating | 0.5 | middle | large (plating step required) |
| Au sputtering | 0.2 | high | small |
| Ti sputtering | 0.2 | low | small |
| Cr sputtering | 0.3 | low | small |
| ing | | | |

As is apparent from the above table, a film magnetic head with highly reliable pads can be readily manufactured with low cost according to the invention.

What is claimed is:

1. In a film magnetic head which includes an electrode pad made of a corrosive material connected to a coil conductor layer, the improvement comprising a corrosion prevention layer of one of chromium and titanium formed on and completely covering an exposed surface of said electrode pad.

2. A film magnetic head of the type having a coil conductor layer and an electrode pad made of a corrosive material formed on a portion of said coil conductor layer, wherein the improvement comprises:
   a corrosion prevention layer formed on said electrode pad;
   an indicator layer over a portion of said corrosion prevention layer for indicating an etching stop point for etching through said indicator layer to said corrosion prevention layer;
   an adhesion layer over said indicator layer; and
   an insulating layer over said adhesion layer, said adhesion layer adhering said indicator layer to said insulating layer.

3. A film magnetic head as claimed in claim 2 wherein said indicator layer is a different color than said corrosion prevention layer.

4. A film magnetic head as claimed in claim 2 wherein said corrosion prevention layer is a material selected from the group consisting of titanium and chromium.

5. A film magnetic head as claimed in claim 4 wherein said electrode pad and said indicator layer are copper.

* * * * *